United States Patent
Lin

(10) Patent No.: US 8,663,044 B2
(45) Date of Patent: Mar. 4, 2014

(54) SPROCKET ASSEMBLY THAT IS WORKED EASILY AND QUICKLY

(76) Inventor: De-Hsin Lin, Changhua (TW)

( * ) Notice: Subject to any disclaimer, the term of this patent is extended or adjusted under 35 U.S.C. 154(b) by 324 days.

(21) Appl. No.: 13/052,335

(22) Filed: Mar. 21, 2011

(65) Prior Publication Data

US 2012/0244976 A1 Sep. 27, 2012

(51) Int. Cl.
*F16H 55/12* (2006.01)
*F16H 55/30* (2006.01)

(52) U.S. Cl.
USPC .......................................................... 474/160

(58) Field of Classification Search
USPC .......................................................... 474/160
See application file for complete search history.

(56) References Cited

U.S. PATENT DOCUMENTS

| | | | | |
|---|---|---|---|---|
| 5,194,051 A * | 3/1993 | Nagano | ...................... | 474/160 |
| 6,024,662 A * | 2/2000 | Fujimoto | ..................... | 474/144 |
| 6,102,821 A * | 8/2000 | Nakamura | ................... | 474/160 |
| 6,488,603 B2 * | 12/2002 | Lim et al. | ....................... | 474/160 |
| 7,871,347 B2 * | 1/2011 | Kamada | ....................... | 474/160 |
| 7,959,529 B2 * | 6/2011 | Braedt | ........................... | 474/160 |
| 8,057,338 B2 * | 11/2011 | Kamada | ....................... | 474/160 |
| 8,100,795 B2 * | 1/2012 | Reiter | ........................... | 474/160 |
| 2003/0064844 A1 * | 4/2003 | Lin | ............................... | 474/160 |
| 2004/0121867 A1 * | 6/2004 | Reiter | ........................... | 474/160 |
| 2005/0009654 A1 * | 1/2005 | Kanehisa et al. | ............. | 474/152 |
| 2005/0272546 A1 * | 12/2005 | Reiter | ........................... | 474/152 |
| 2006/0063624 A1 * | 3/2006 | Voss | ................................. | 474/78 |
| 2007/0054770 A1 * | 3/2007 | Valle | .............................. | 474/160 |
| 2008/0188336 A1 * | 8/2008 | Tokuyama | .................... | 474/160 |
| 2008/0234082 A1 * | 9/2008 | Braedt | .......................... | 474/116 |
| 2009/0042679 A1 * | 2/2009 | Valle | .............................. | 474/152 |
| 2009/0042682 A1 * | 2/2009 | Dal Pra' et al. | ............... | 474/160 |
| 2010/0009794 A1 * | 1/2010 | Chiang | ......................... | 474/160 |
| 2010/0075791 A1 * | 3/2010 | Braedt | .......................... | 474/160 |
| 2010/0099530 A1 * | 4/2010 | Chiang et al. | ................. | 474/160 |
| 2011/0105263 A1 * | 5/2011 | Braedt | .......................... | 474/160 |
| 2012/0225745 A1 * | 9/2012 | Oishi et al. | .................... | 474/160 |

* cited by examiner

*Primary Examiner* — William A Rivera
*Assistant Examiner* — Henry Liu
(74) *Attorney, Agent, or Firm* — Alan Kamrath; Kamrath IP Lawfirm, P.A.

(57) ABSTRACT

A sprocket assembly for a bicycle includes a sprocket body formed by a plurality of sprocket rings, and a collar mounted in the sprocket body. The sprocket body has a first side provided with a fitting portion and a second side provided with a mounting tube. The collar is received in the fitting portion of the sprocket body. The sprocket rings have different inner diameters so that the sprocket rings are arranged to have a stepped inner periphery, and have different outer diameters so that the sprocket rings are arranged to have a stepped outer periphery. Thus, the collar is separated from the sprocket body and is made independently so that the collar can be worked easily and quickly to fit shafts of different specifications and sizes and to fit the sprocket body of different specifications and sizes.

18 Claims, 4 Drawing Sheets

SPROCKET ASSEMBLY THAT IS WORKED EASILY AND QUICKLY

BACKGROUND OF THE INVENTION

1. Field of the Invention

The present invention relates to a sprocket and, more particularly, to a sprocket assembly for a bicycle.

2. Description of the Related Art

A conventional sprocket assembly 10 for a bicycle in accordance with the prior art shown in FIG. 1 comprises a mounting tube 11, a plurality of sprocket rings 12 surrounding the mounting tube 11, a plurality of connecting ribs 13 mounted between the mounting tube 11 and the sprocket rings 12 to connect the mounting tube 11 with the sprocket rings 12, and a plurality of openings 14 formed between the connecting ribs 13. The mounting tube 11 is mounted on a shaft of a hub. However, a working tool is not easily inserted into the openings 14 to work the connecting ribs 13 so that the sprocket assembly 10 is not worked easily and quickly. In addition, the mounting tube 11 has a fixed size and is fit for a shaft of a fixed size so that the sprocket assembly 10 is not available for shafts of different sizes and specifications.

BRIEF SUMMARY OF THE INVENTION

In accordance with the present invention, there is provided a sprocket assembly, comprising a sprocket body and a collar mounted in the sprocket body. The sprocket body is formed by a plurality of sprocket rings which are juxtaposed to each other. The sprocket body has a first side provided with a fitting portion and a second side provided with a mounting tube. The fitting portion of the sprocket body has an inner wall provided with a receiving space connected to the mounting tube of the sprocket body. The receiving space of the fitting portion and the mounting tube of the sprocket body are surrounded by the sprocket rings. Each of the sprocket rings surrounding the receiving space of the fitting portion has an inner wall provided with a plurality of flanges and a plurality of recesses between the flanges. Each of the sprocket rings surrounding the mounting tube has an inner wall provided with a plurality of connecting ribs and a plurality of spaces between the connecting ribs. The sprocket rings surrounding the mounting tube are connected with the mounting tube by the connecting ribs.

The collar is received in the fitting portion of the sprocket body. The fitting portion of the sprocket body has an inner wall provided with a receiving space connected to the mounting tube of the sprocket body. The receiving space of the fitting portion has a first side provided with a first axial end portion and a second axial end portion. The mounting tube of the sprocket body is connected with the second axial end portion of the receiving space.

The sprocket rings have different inner diameters which are reduced gradually from the first axial end portion to the second axial end portion of the receiving space so that the sprocket rings are arranged to have a stepped inner periphery. The sprocket rings have different outer diameters which are reduced gradually from the first axial end portion of the receiving space to the mounting tube so that the sprocket rings are arranged to have a stepped outer periphery.

The second axial end portion of the receiving space has a diameter smaller than that of the first axial end portion of the receiving space, and the receiving space of the fitting portion has an inner diameter that is convergent and reduced gradually from the first axial end portion to the second axial end portion of the receiving space so that the receiving space of the fitting portion has a substantially stepped shape.

The primary objective of the present invention is to provide a sprocket assembly that is worked easily and quickly.

According to the primary advantage of the present invention, each of the sprocket rings surrounding the receiving space of the fitting portion has an inner wall provided with a plurality of flanges and a plurality of recesses between the flanges to facilitate a working tool working the flanges through the recesses.

According to another advantage of the present invention, each of the sprocket rings surrounding the mounting tube has an inner wall provided with a plurality of connecting ribs and a plurality of spaces between the connecting ribs to facilitate a working tool working the connecting ribs through the spaces.

According to a further advantage of the present invention, each of the connecting ribs has an end face flush with an end face of the mounting tube to facilitate a working tool working the connecting ribs and the flanges.

According to a further advantage of the present invention, the collar is separated from the sprocket body and is made independently so that the collar can be worked easily and quickly to fit shafts of different specifications and sizes and to fit the sprocket body of different specifications and sizes, thereby decreasing the cost of fabrication.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
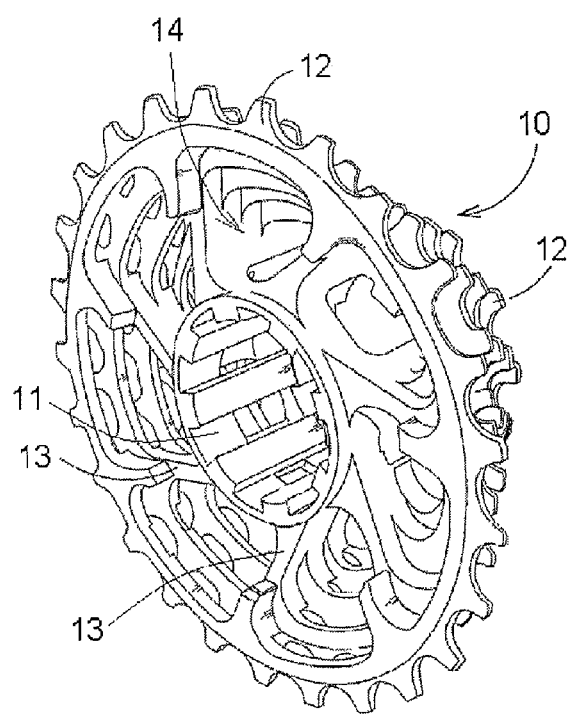
FIG. 1 is a perspective view of a conventional sprocket assembly in accordance with the prior art.
Figure 2:
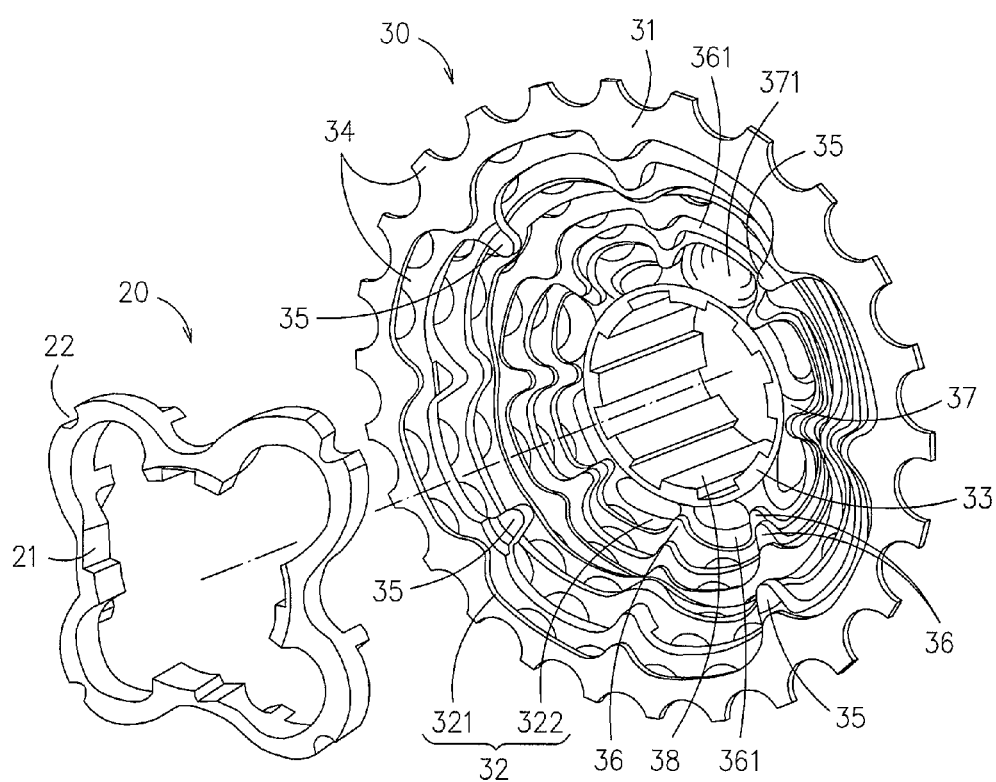
FIG. 2 is an exploded perspective view of a sprocket assembly in accordance with the preferred embodiment of the present invention.
Figure 4:
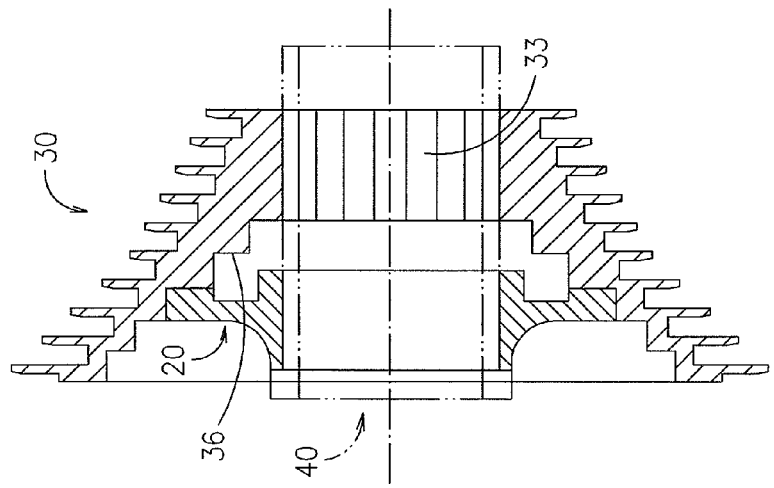
FIG. 4 is a front cross-sectional assembly view of the sprocket assembly as shown in FIG. 3.

Referring to the drawings and initially to FIGS. 2-5, a sprocket assembly for a bicycle in accordance with the preferred embodiment of the present invention comprises a sprocket body 30 and a collar 20 mounted in the sprocket body 30.

The sprocket body 30 is formed by a plurality of sprocket rings 34 which are juxtaposed to each other. The sprocket body 30 has a plurality of clearances 341 defined between the sprocket rings 34. The sprocket body 30 has a first side provided with a fitting portion 31 and a second side provided with a mounting tube 33. The fitting portion 31 of the sprocket body 30 has an inner wall provided with a receiving space 32 connected to the mounting tube 33 of the sprocket body 30. The receiving space 32 of the fitting portion 31 and the mounting tube 33 of the sprocket body 30 are surrounded by the sprocket rings 34. The receiving space 32 of the fitting portion 31 has a first side provided with a first axial end portion 321 and a second axial end portion 322. The second axial end portion 322 of the receiving space 32 is disposed between the first axial end portion 321 of the receiving space 32 and the mounting tube 33 of the sprocket body 30.

The mounting tube 33 of the sprocket body 30 is co-axial with the fitting portion 31 of the sprocket body 30 and is connected with the second axial end portion 322 of the receiving space 32. The mounting tube 33 of the sprocket body 30 has an inner wall provided with a plurality of elongate splines 38 which are arranged in an annular manner.

The sprocket rings 34 have different outer diameters which are reduced gradually from the first axial end portion 321 of the receiving space 32 to the mounting tube 33 so that the sprocket rings 34 are arranged to have a stepped outer periphery. The sprocket rings 34 have different inner diameters which are reduced gradually from the first axial end portion 321 to the second axial end portion 322 of the receiving space 32 so that the sprocket rings 34 are arranged to have a stepped inner periphery.

The second axial end portion 322 of the receiving space 32 has a diameter smaller than that of the first axial end portion 321 of the receiving space 32, and the receiving space 32 of the fitting portion 31 has an inner diameter that is convergent and reduced gradually from the first axial end portion 321 to the second axial end portion 322 of the receiving space 32 so that the receiving space 32 of the fitting portion 31 has a substantially stepped shape. The diameter of the second axial end portion 322 of the receiving space 32 is greater than that of the mounting tube 33.

Each of the sprocket rings 34 surrounding the receiving space 32 of the fitting portion 31 has an inner wall provided with a plurality of flanges 36 and a plurality of recesses 361 between the flanges 36. The flanges 36 of the sprocket rings 34 are extended from the first axial end portion 321 to the second axial end portion 322 of the receiving space 32 to form a convergent stepped shape. The inner wall of one of the sprocket rings 34 is provided with a plurality of positioning lugs 35 for positioning the collar 20.

Figure 3:
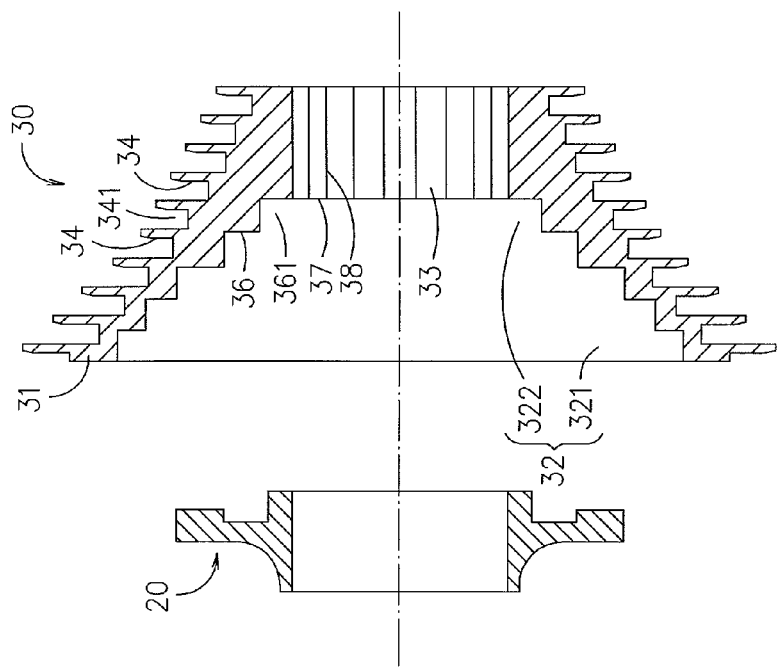
FIG. 3 is a front cross-sectional view of the sprocket assembly as shown in FIG. 2.

Each of the sprocket rings 34 surrounding the mounting tube 33 has an inner wall provided with a plurality of connecting ribs 37 and a plurality of spaces 371 between the connecting ribs 37. The sprocket rings 34 surrounding the mounting tube 33 are connected with the mounting tube 33 by the connecting ribs 37. The connecting ribs 37 of the sprocket rings 34 extend along a whole length of the mounting tube 33. Each of the connecting ribs 37 has an end face flush with an end face of the mounting tube 33 as shown in FIG. 3. The connecting ribs 37 are connected with the flanges 36, and the spaces 371 of the connecting ribs 37 are connected to the recesses 361 of the flanges 36.

The collar 20 is received in the fitting portion 31 of the sprocket body 30. The collar 20 is fitted into one of the sprocket rings 34 and is stopped by the flanges 36 of another one of the sprocket rings 34. The collar 20 has an outer wall provided with a plurality of positioning grooves 22 fitted onto the positioning lugs 35 of one of the sprocket rings 34 in a close fit manner. The collar 20 has an inner wall provided with a mounting portion 21.

In the preferred embodiment of the present invention, the collar 20 is made of a metallic alloy, such as a titanium alloy and the like. The collar 20 has an endless rhombus shape and has four positioning grooves 22 formed on four corners thereof, and one of the sprocket rings 34 has four positioning lugs 35 corresponding to the four positioning grooves 22 of the collar 20. The sprocket body 30 is made of a metallic alloy, such as an aluminum alloy and the like. The sprocket body 30 is formed by ten sprocket rings 34, and a chain (not shown) is mounted on one of the sprocket rings 34.

In assembly, the collar 20 is fitted into one of the sprocket rings 34 and is stopped by the flanges 36 of another one of the sprocket rings 34. Then, a shaft 40 of a hub (not shown) is extended through the mounting portion 21 of the collar 20 and the splines 38 of the mounting tube 33. Then, the chain is mounted on one of the sprocket rings 34 to accomplish assembly of the sprocket assembly.

Accordingly, each of the sprocket rings 34 surrounding the receiving space 32 of the fitting portion 31 has an inner wall provided with a plurality of flanges 36 and a plurality of recesses 361 between the flanges 36 to facilitate a working tool working the flanges 36 through the recesses 361. In addition, each of the sprocket rings 34 surrounding the mounting tube 33 has an inner wall provided with a plurality of connecting ribs 37 and a plurality of spaces 371 between the connecting ribs 37 to facilitate a working tool working the connecting ribs 37 through the spaces 371. Further, each of the connecting ribs 37 has an end face flush with an end face of the mounting tube 33 to facilitate a working tool working the connecting ribs 37 and the flanges 36. Further, the collar 20 is separated from the sprocket body 30 and is made independently so that the collar 20 can be worked easily and quickly to fit the shaft 40 of different specifications and sizes and to fit the sprocket body 30 of different specifications and sizes, thereby decreasing the cost of fabrication.

Figure 6:
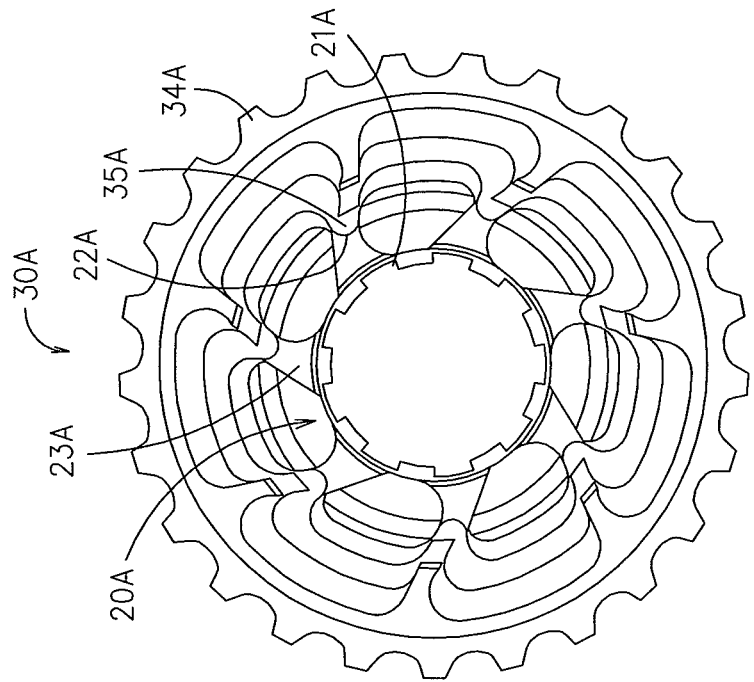
FIG. 6 is a side assembly view of a sprocket assembly in accordance with another preferred embodiment of the present invention.
Figure 5:
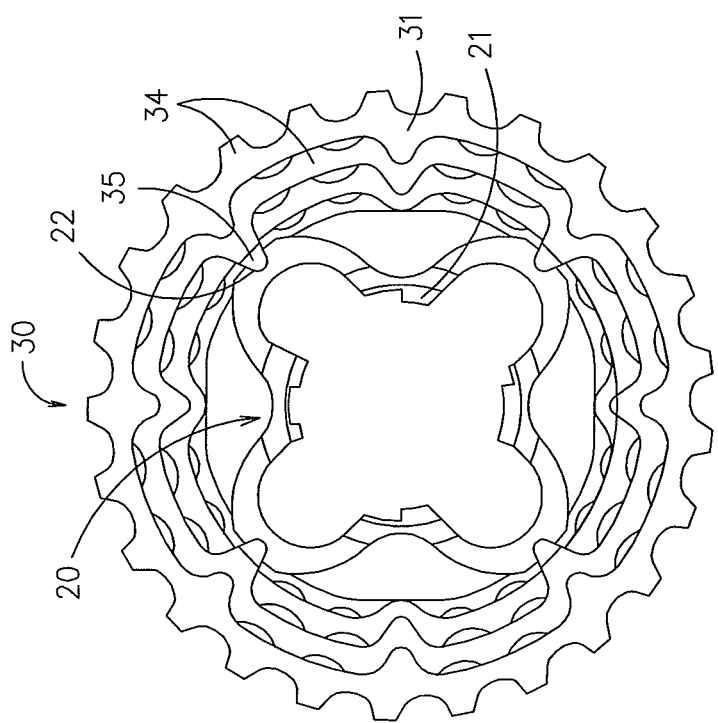
FIG. 5 is a side assembly view of the sprocket assembly as shown in FIG. 2.

Referring to FIG. 6, the sprocket body 30A is formed by a plurality of sprocket rings 34A which are connected with each other. The inner wall of one of the sprocket rings 34A is provided with a plurality of positioning lugs 35A for positioning the collar 20A. The collar 20A has a ring shape. The collar 20A has an outer wall provided with a plurality of protruding spokes 23A each having a distal end formed with a positioning groove 22A fitted onto a respective one of the positioning lugs 35A of one of the sprocket rings 34A in a close fit manner. The collar 20A has an inner wall provided with a mounting portion 21A.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A sprocket assembly, comprising:
a sprocket body; and
a collar mounted in the sprocket body;
wherein the sprocket body is formed by a plurality of sprocket rings which are juxtaposed to each other;
the sprocket body has a first side provided with a fitting portion and a second side provided with a mounting tube;
the fitting portion of the sprocket body has an inner wall provided with a receiving space connected to the mounting tube of the sprocket body;
the receiving space of the fitting portion and the mounting tube of the sprocket body are surrounded by the sprocket rings;
each of the sprocket rings surrounding the receiving space of the fitting portion has an inner wall provided with a plurality of flanges and a plurality of recesses between the flanges;

each of the sprocket rings surrounding the mounting tube has an inner wall provided with a plurality of connecting ribs and a plurality of spaces between the connecting ribs;

the connecting ribs are formed on and extended between the mounting tube and each of the sprocket rings surrounding the mounting tube;

each of the spaces rings surroundin the mounting tube is aligned with the respective recess of each of the sprocket rings surrounding the receiving space of the fitting portion;

the sprocket rings surrounding the mounting tube are connected with the mounting tube by the connecting ribs.

2. The sprocket assembly of claim 1, wherein
the collar is received in the fitting portion of the sprocket body;
the receiving space of the fitting portion has a first side provided with a first axial end portion and a second axial end portion;
the mounting tube of the sprocket body is connected with the second axial end portion of the receiving space.

3. The sprocket assembly of claim 2, wherein
the sprocket rings have different inner diameters which are reduced gradually from the first axial end portion to the second axial end portion of the receiving space;
the sprocket rings are arranged to have a stepped inner periphery.

4. The sprocket assembly of claim 3, wherein
the sprocket rings have different outer diameters which are reduced gradually from the first axial end portion of the receiving space to the mounting tube;
the sprocket rings are arranged to have a stepped outer periphery.

5. The sprocket assembly of claim 2, wherein
the second axial end portion of the receiving space has a diameter smaller than that of the first axial end portion of the receiving space;
the receiving space of the fitting portion has an inner diameter that is convergent and reduced gradually from the first axial end portion to the second axial end portion of the receiving space;
the receiving space of the fitting portion has a substantially stepped shape.

6. The sprocket assembly of claim 5, wherein the diameter of the second axial end portion of the receiving space is greater than that of the mounting tube.

7. The sprocket assembly of claim 3, wherein the flanges of the sprocket rings are extended from the first axial end portion to the second axial end portion of the receiving space to form a convergent stepped shape.

8. The sprocket assembly of claim 1, wherein each of the connecting ribs has an end face flush with an end face of the mounting tube.

9. The sprocket assembly of claim 2, wherein the collar is fitted into one of the sprocket rings and is stopped by the flanges of another one of the sprocket rings.

10. The sprocket assembly of claim 9, wherein
one of the sprocket rings has an inner wall provided with a plurality of positioning lugs for positioning the collar;
the collar has an outer wall provided with a plurality of positioning grooves fitted onto the positioning lugs of one of the sprocket rings in a close fit manner.

11. The sprocket assembly of claim 10, wherein
the collar has an endless rhombus shape and has four positioning grooves formed on four corners thereof;
one of the sprocket rings has four positioning lugs corresponding to the four positioning grooves of the collar.

12. The sprocket assembly of claim 1, wherein the collar has
an inner wall provided with a mounting portion.

13. The sprocket assembly of claim 1, wherein the sprocket body has a plurality of clearances defined between the sprocket rings.

14. The sprocket assembly of claim 1, wherein the mounting tube of the sprocket body has an inner wall provided with a plurality of elongate splines which are arranged in an annular manner.

15. The sprocket assembly of claim 9, wherein
one of the sprocket rings has an inner wall provided with a plurality of positioning lugs for positioning the collar;
the collar has an outer wall provided with a plurality of protruding spokes each having a distal end formed with a positioning groove fitted onto a respective one of the positioning lugs of one of the sprocket rings in a close fit manner.

16. The sprocket assembly of claim 15, wherein the collar has a ring shape.

17. The sprocket assembly of claim 2, wherein
the second axial end portion of the receiving space is disposed between the first axial end portion of the receiving space and the mounting tube of the sprocket body;
the mounting tube of the sprocket body is co-axial with the fitting portion of the sprocket body;
the connecting ribs of the sprocket rings extend along a whole length of the mounting tube;
the connecting ribs are connected with the flanges;
the spaces of the connecting ribs are connected to the recesses of the flanges.

18. The sprocket assembly of claim 1, wherein
the collar is made of a metallic alloy;
the sprocket body is made of a metallic alloy.

* * * * *